United States Patent [19]
Wu et al.

[11] Patent Number: 5,621,136
[45] Date of Patent: Apr. 15, 1997

[54] COLORLESS, NON-TOXIC, STABILIZED AQUEOUS SOLUTION OF A C1-C5 ALKYL VINYL ETHER AND MALEIC ACID COPOLYMER

[75] Inventors: Chi-San Wu; James Curry, both of Wayne, N.J.; James P. Cullen, Bartonsville, Pa.; John S. McEwan, Paducah, Ky.

[73] Assignee: ISP Investments Inc., Wilmington, Del.

[21] Appl. No.: 542,579

[22] Filed: Oct. 13, 1995

[51] Int. Cl.$^6$ .......................... C07C 69/00; C07C 69/007; C07C 69/01
[52] U.S. Cl. ............................................................. 560/2
[58] Field of Search ...................................... 560/2

[56] References Cited

U.S. PATENT DOCUMENTS 3,531,427  9/1970  Kervenski et al. ................. 260/29.6
4,129,644  12/1978  Kalopissis et al. ................. 424/59

OTHER PUBLICATIONS

CA119:34113e (1993).
CA122:114628d (1995).

*Primary Examiner*—Porifirio Nazario-Gonzalez
*Assistant Examiner*—Barbara S. Frazier
*Attorney, Agent, or Firm*—Walter Katz; Marilyn J. Maue; Joshua J. Ward

[57] ABSTRACT

A method of stabilizing an aqueous solution of an acid copolymer of maleic acid and a $C_1$–$C_5$ alkyl vinyl ether against degradation in viscosity or molecular weight upon storage for an extended period of time in aqueous solution at ambient conditions, with a single stabilizing agent, which comprises forming the acid copolymer, preferably directly from a slurry of corresponding anhydride in an organic solvent by hydrolysis in water, and adding superoxide dismutase as the single stabilizing agent to the solution either before or after hydrolysis.

4 Claims, No Drawings

COLORLESS, NON-TOXIC, STABILIZED AQUEOUS SOLUTION OF A C1-C5 ALKYL VINYL ETHER AND MALEIC ACID COPOLYMER

BACKGROUND OF THE INVENTION

1. Field of the Invention

This invention relates to copolymers of $C_1$–$C_5$ alkyl vinyl ether and maleic acid, and, more particularly, to colorless, stabilized aqueous solutions of such acid copolymers, preferably by hydrolyzing the corresponding anhydride copolymer before drying it to a powder.

2. Description of the Prior Art

The copolymerization of maleic anhydride and a $C_1$–$C_5$ alkyl vinyl ether yields a copolymer which is more properly characterized as an interpolymer wherein both ethylenically unsaturated moieties enter into the formation of the same polymer chain. It has been indicated by infra-red spectroscopy, nuclear magnetic resonance spectroscopy and other chemical analyses that alkyl vinyl ethers and maleic anhydride interpolymerize in the molar ratio of about 1:1, the polymer chain thereof containing alternating anhydride units and alkyl vinyl ether units. The resulting anhydride interpolymers can be hydrolyzed in water to the corresponding acid interpolymer. Such acid interpolymers are known to be useful in personal care products and other applications.

Generally, copolymers of maleic acid and an alkyl vinyl ether, e.g. methyl vinyl ether, e.g. Gantrez® 97, are prepared by hydrolyzing powders of the anhydride precursor copolymer, e.g. Gantrez® AN-169.

Under normal ambient storage conditions, however, it is known that copolymers of maleic acid and an alkyl vinyl ether prepared from the anhydride powder will degrade with time, as evidenced by a decrease in molecular weight and viscosity of the copolymer.

Kervinski, in U.S. Pat. No. 3,531,427, found that the molecular weight of such copolymers could not be stabilized with only a single stabilizing agent, but that it could be stabilized by using a mixture consisting of selected oxidizing and/or reducing agents, e.g. ethylenediamine tetraacetic acid (EDTA), in combination with other secondary additives. The use of such a stabilization mixture, however, may not be suitable, due to the toxicity of the secondary agent, or discoloring of the copolymer solution in the presence of the stabilizer mixture.

Frosch, et al, in Ger. Patent 4,213,972 A1, described the use of a single stabilizer agent for copolymers of maleic acid or maleic anhydride and alkyl vinyl ethers which was a phenol containing a tert-butyl group. However, in general, phenols are not favored due to their toxicity.

Accordingly, it is an object of this invention to provide a colorless, stabilized aqueous solution of a copolymer of a $C_1$–$C_5$ alkyl vinyl ether and maleic acid which is suitable for personal care and industrial applications, using a single stabilizing agent which is effective for stabilizing the copolymer even when used at low concentrations.

Another object of the invention is to provide a process of preparing such colorless, stabilized aqueous solutions having higher viscosities than available previously and which will retain their initial viscosity levels over extended periods of time.

A feature of the invention is a process for stabilizing such copolymers in which the acid copolymer is made by hydrolyzing the corresponding anhydride copolymer while it is still in a wet state, i.e. before drying it to a powder.

SUMMARY OF THE INVENTION

What has been discovered herein is that a single stabilizing agent of superoxide dismutase (S.D.) can stabilize an aqueous solution of an acid copolymer of maleic acid and a $C_1$–$C_5$ alkyl vinyl ether against degradation in viscosity or molecular weight upon storage for an extended period of time in aqueous solution at ambient conditions.

Preferably, the acid copolymer is made from corresponding anhydride copolymer by hydrolysis in an organic solvent, and, while the anhydride copolymer is still wet, i.e. before drying to a powder.

The superoxide dismutase stabilizer can be added either before or after hydrolysis.

DESCRIPTION OF THE INVENTION

A high molecular weight copolymer of maleic acid and methyl vinyl ether (Gantrez® S-97) was prepared directly from the anhydride precursor (Gantrez® AN-169) by hydrolysis with water. Preferably, the anhydride precursor starting material for the hydrolysis was a benzene slurry, in wet form, without the conventional drying step to form a powder. During the hydrolysis, the benzene solvent is removed. The acid copolymer is stabilized by the addition of superoxide dismutase. The product is an aqueous solution of the acid copolymer stabilized with superoxide dismutase, in a stabilizing amount of about 50 to 1000 ppm, preferably about 250 ppm.

EXAMPLES

In a typical run, 500 g of a benzene slurry (50% solids) of the anhydride copolymer of maleic anhydride and methyl vinyl ether (GANTREZ® AN169) and 1100 g of water was hydrolyzed in a 2-liter, 5-necked, jacketed glass reaction flask accommodating a stirring shaft for mixing, a water-cooled condenser to collect benzene vapors, a rubber septum for introducing additional water, and a nitrogen sparge tube. The flask allowed for a positive pressure of nitrogen to be maintained during the reaction.

The reaction was started by stirring the mixture with a subsurface nitrogen sparge for 20 minutes. Then the mixture was heated at 70° C. for 4 hours with atmospheric nitrogen sparge. During hydrolysis, benzene and water were collected in a receiving flask below the condenser. Heated water was added during the reaction to maintain a final solids content of 10 to 16%. No residual benzene level was detectable, i.e. it was <0.2 ppm.

The acid copolymer solution then was spiked with superoxide dismutase (SD) (Sigma Chemical Co., St. Louis, Mo.) 0.025% by weight and mixed for 3 days on a slowly rotating wheel. The stabilized solution then was stored for 6-months in clear, capped glass bottles. Then the solutions of Gantrez® S97 were analyzed for molecular weight and viscosity. The results are shown in the Table below.

TABLE

| Copolymer | Additive | □ Mw × $10^6$ | *Specific Viscosity |
|---|---|---|---|
| Gantrez ® S97 (from wet Gantrez ® AN-169) | None | 0.80 → 0.53 | 1.30 → 0.95 |
| Gantrez ® S97 (from | S.D. | 0.80 → 0.70 | 1.30 → 1.18 |

TABLE-continued

| Copolymer | Additive | $Mw \times 10^6$ | *Specific Viscosity |
|---|---|---|---|
| wet Gantrez® AN-169 Gantrez® S97 (from powders of Gantrez® AN-169) | (0.025%) None | | **7.44 → 1.39 |
| Gantrez® S97 (from powders of Gantrez® AN-169) | S.D. (0.025%) | | **7.78 → 1.27 |

☐ Mw by GPC relative to PEO, Shodex column, solvent equivalent to viscosity solvent below.
*0.63 mm Ubbelhode tube, 25° C., 0.25% (w/v) solution using 0.2M $LiNO_3$, 0.1M TRIS buffer adjusted to pH 9.
**1% in water The results in the Table show that polymer solutions with superoxide dismutase maintain a molecular weight (MD) which is about 88% of the MW of the initial polymer. The viscosity data also parallel the MW trends. The presence of the superoxide dismutase as stabilizer enabled the Gantrez® S-97 solution to maintain 92% of its viscosity after a 6-month period.

While the invention has been described with particular reference to certain embodiments thereof, it will be understood that changes and modifications may be made which are within the skill of the art. Accordingly, it is intended to be bound only by the following claims, in which:

What is claimed is:

1. A method of stabilizing an aqueous solution consisting essentially of an acid copolymer of maleic acid and a $C_1$–$C_5$ alkyl vinyl ether against degradation in viscosity or molecular weight upon storage for an extended period of time in aqueous solution at ambient conditions which comprises forming the acid copolymer directly from a slurry of corresponding anhydride in an organic solvent by hydrolysis in water, and adding superoxide dismutase in an amount of 50 to 10,000 ppm as the single stabilizing agent to the solution either before or after hydrolysis.

2. A method according to claim 1 wherein said $C_1$–$C_5$ alkyl vinyl ether is methyl vinyl ether.

3. A stabilized aqueous solution consisting essentially of an acid copolymer of maleic acid and a $C_1$–$C_5$ alkyl vinyl ether and superoxide dismutase in an amount of 50 to 10,000 ppm.

4. A solution according to claim 3 wherein said $C_1$–$C_5$ alkyl vinyl ether is methyl vinyl ether.

* * * * *